(12) United States Patent
Taylor

(10) Patent No.: US 9,813,369 B2
(45) Date of Patent: Nov. 7, 2017

(54) TRACKING MESSAGES IN A MENTORING ENVIRONMENT

(71) Applicant: INTERNATIONAL BUSINESS MACHINES CORPORATION, Armonk, NY (US)

(72) Inventor: Stella Lee Taylor, Armonk, NY (US)

(73) Assignee: International Business Machines Corporation, Armonk, NY (US)

( * ) Notice: Subject to any disclaimer, the term of this patent is extended or adjusted under 35 U.S.C. 154(b) by 985 days.

(21) Appl. No.: 13/929,862

(22) Filed: Jun. 28, 2013

(65) Prior Publication Data

US 2014/0156767 A1 Jun. 5, 2014

Related U.S. Application Data

(63) Continuation of application No. 11/559,041, filed on Nov. 13, 2006, now Pat. No. 8,510,388.

(51) Int. Cl.
G06Q 10/10 (2012.01)
H04L 29/06 (2006.01)
H04L 12/58 (2006.01)

(52) U.S. Cl.
CPC ........... H04L 51/22 (2013.01); G06Q 10/107 (2013.01); H04L 51/00 (2013.01); H04L 51/04 (2013.01); H04L 51/12 (2013.01); H04L 51/34 (2013.01)

(58) Field of Classification Search
CPC ......... H04L 51/00; H04L 51/12; H04L 51/22; H04L 51/34; G06Q 10/107
See application file for complete search history.

(56) References Cited

U.S. PATENT DOCUMENTS

| 2007/0094725 A1* | 4/2007 | Borders | G06F 21/552 726/22 |
| 2007/0233787 A1* | 10/2007 | Pagan | G06Q 10/107 709/206 |
| 2008/0005325 A1* | 1/2008 | Wynn | G06Q 10/107 709/225 |
| 2010/0063884 A1* | 3/2010 | Aaron | 705/14.66 |

* cited by examiner

*Primary Examiner* — Aaron Strange
(74) *Attorney, Agent, or Firm* — Schmeiser, Olsen & Watts, LLP; John R. Pivnichny

(57) ABSTRACT

Tracking messages in a mentoring environment includes presenting to a reviewer a computer-based activity tracking form that is populated with data from an underlying relational database. The underlying relational database includes a content of e-mail messages addressed to an adult mentor and a content of e-mail messages addressed to a juvenile protégé. The underlying relational database also includes a status of e-mail messages between the adult mentor and juvenile protégé as determined by an e-mail interceptor. A status of an e-mail, between the adult mentor and the juvenile protégé, which has been intercepted by the e-mail monitor is displayed. In response to a displayed status indicating that the e-mail has not been reviewed, transmission of the e-mail to an intended recipient is blocked. In response to the displayed status indicating that the e-mail has been reviewed, transmission of the e-mail to the intended recipient is enabled.

11 Claims, 15 Drawing Sheets

ACTIVITY TRACKING FORM (200a)

| ACTIVITY NAME (202) | | | | | | | | | | | MENTORS (206) | | PROTÉGÉ (208) | | TEACHER (210) | MESSAGES POSTED (212) | |
|---|---|---|---|---|---|---|---|---|---|---|---|---|---|---|---|---|---|
| SUB-ACTIVITY 1 (204) | | SUB-ACTIVITY 2 | | SUB-ACTIVITY 3 | | SUB-ACTIVITY 4 | | OTHER DISCUSSIONS | | | LAST NAME | FIRST NAME | LAST NAME | FIRST NAME | | MENTOR | PROTÉGÉ |
| M | P | M | P | M | P | M | P | M | P | | ALLRED | RED | BURNS | BOB | GRAY | 0 | 0 |
| M | P | M | P | M | P | M | P | M | P | | BLUE | BONNIE | CARTER | CAROL | GRAY | 0 | 0 |
| M | P | M | P | M | P | M | P | M | P | | CREAM | CAREN | TRUMP | TED | GRAY | 0 | 0 |
| M | P | M | P | M | P | M | P | M | P | | DINGY | DOUG | ABRAHAM | ALICE | GRAY | 0 | 0 |
| M | P | M | P | M | P | M | P | M | P | | EGGPLANT | EDWARD | WEED | WINNIE | GRAY | 0 | 0 |
| M | P | M | P | M | P | M | P | M | P | | FRENCH | FRAN | WARNER | WAYNE | GRAY | 0 | 0 |
| DAILY MESSAGES POSTED | | | | | | | | | | | GRAND TOTAL | | | | | MENTOR | STUDENT |
| 0 | 0 | 0 | 0 | 0 | 0 | 0 | 0 | 0 | 0 | | | | | | | 0 | 0 |

(214 brackets the mentor rows)

FIG. 2A

ACTIVITY TRACKING FORM 200b

| ACTIVITY NAME | | | | | | | | | | | MENTORS | | PROTÉGÉ | | TEACHER | MESSAGES POSTED | |
|---|---|---|---|---|---|---|---|---|---|---|---|---|---|---|---|---|---|
| SUB-ACTIVITY 1 | | SUB-ACTIVITY 2 | | SUB-ACTIVITY 3 | | SUB-ACTIVITY 4 | | OTHER DISCUSSIONS | | LAST NAME | FIRST NAME | LAST NAME | FIRST NAME | | MENTOR | PROTÉGÉ |
| M | P | M | P | M | P | M | P | M | P | | | | | | | |
| M | P | M | P | M | P | M | P | M | P | ALLRED | RED | BURNS | BOB | GRAY | 0 | 0 |
| M | P | M | P | M | P | M | P | M | P | BLUE | BONNIE | CARTER | CAROL | GRAY | 1 | 1 |
| M | P | M | P | M | P | M | P | M | P | CREAM | CAREN | TRUMP | TED | GRAY | 0 | 1 |
| M | P | M | P | M | P | M | P | M | P | DINGY | DOUG | ABRAHAM | ALICE | GRAY | 1 | 1 |
| M | P | M | P | M | P | M | P | M | P | EGGPLANT | EDWARD | WEED | WINNIE | GRAY | 1 | 0 |
| M | P | M | P | M | P | M | P | M | P | FRENCH | FRAN | WARNER | WAYNE | GRAY | 0 | 1 |
| DAILY MESSAGES POSTED | | | | | | | | | | GRAND TOTAL | | | | | MENTOR | STUDENT |
| 3 | 4 | 0 | 0 | 0 | 0 | 0 | 0 | 0 | 0 | | | | | | 3 | 4 |

ACTIVITY TRACKING FORM — 200c

Popup message:
```
HELLO CAROL
HOW ARE YOU TODAY? I HOPE THINGS ~216
ARE GOING WELL IN SCHOOL FOR YOU.
ARE YOU READY FOR CHRISTMAS?
I LOOK FORWARD TO HEARING FROM YOU. BONNIE
CLOSE THIS WINDOW ~218
```

| | | | MENTORS | | PROTÉGÉ | | TEACHER | MESSAGES POSTED | |
|---|---|---|---|---|---|---|---|---|---|
| SUB-ACTIVITY 1 | SUB-ACTIVITY 2 | SUB-ACTIVITY 3 | SUB-ACTIVITY 4 | OTHER DISCUSSIONS | LAST NAME | FIRST NAME | LAST NAME | FIRST NAME | | MENTOR | PROTÉGÉ |
| M P | M P | M P | M P | M P | ALLRED | RED | BURNS | BOB | GRAY | 0 | 0 |
| M P | M P | M P | M P | M P | BLUE | BONNIE | CARTER | CAROL | GRAY | 1 | 1 |
| M P | M P | M P | M P | M P | CREAM | CAREN | TRUMP | TED | GRAY | 0 | 1 |
| M P | M P | M P | M P | M P | DINGY | DOUG | ABRAHAM | ALICE | GRAY | 1 | 1 |
| M P | M P | M P | M P | M P | EGGPLANT | EDWARD | WEED | WINNIE | GRAY | 1 | 0 |
| M P | M P | M P | M P | M P | FRENCH | FRAN | WARNER | WAYNE | GRAY | 0 | 1 |
| DAILY MESSAGES POSTED | | | | | | | | GRAND TOTAL | MENTOR | STUDENT |
| 3 4 | 0 0 | 0 0 | 0 0 | 0 0 | | | | | 3 | 4 |

ACTIVITY TRACKING FORM 200d

| ACTIVITY NAME | | | | | | | | | | MENTORS | | PROTÉGÉ | | TEACHER | MESSAGES POSTED | |
|---|---|---|---|---|---|---|---|---|---|---|---|---|---|---|---|---|
| SUB-ACTIVITY 1 | | SUB-ACTIVITY 2 | | SUB-ACTIVITY 3 | | SUB-ACTIVITY 4 | | OTHER DISCUSSIONS | | LAST NAME | FIRST NAME | LAST NAME | FIRST NAME | | MENTOR | PROTÉGÉ |
| M | P | M | P | M | P | M | P | M | P | | | | | | | |
| M | P | M | P | M | P | M | P | M | P | ALLRED | RED | BURNS | BOB | GRAY | 0 | 0 |
| X | X | M | P | M | P | M | P | M | P | BLUE | BONNIE | CARTER | CAROL | GRAY | 1 | 1 |
| X | X | M | P | M | P | M | P | M | P | CREAM | CAREN | TRUMP | TED | GRAY | 0 | 1 |
| X | X | M | P | M | P | M | P | M | P | DINGY | DOUG | ABRAHAM | ALICE | GRAY | 1 | 1 |
| X | P | M | P | M | P | M | P | M | P | EGGPLANT | EDWARD | WEED | WINNIE | GRAY | 1 | 0 |
| M | X | M | P | M | P | M | P | M | P | FRENCH | FRAN | WARNER | WAYNE | GRAY | 0 | 1 |
| DAILY MESSAGES POSTED | | | | | | | | | | GRAND TOTAL | | | | MENTOR | STUDENT | |
| 3 | 4 | 0 | 0 | 0 | 0 | 0 | 0 | 0 | 0 | | | | | | 3 | 4 |

ACTIVITY TRACKING FORM

200e

| ACTIVITY NAME | | | | | | | | MENTORS | | PROTÉGÉ | | TEACHER | MESSAGES POSTED | |
|---|---|---|---|---|---|---|---|---|---|---|---|---|---|---|
| SUB-ACTIVITY 1 | | SUB-ACTIVITY 2 | | SUB-ACTIVITY 3 | | SUB-ACTIVITY 4 | | OTHER DISCUSSIONS | | LAST NAME | FIRST NAME | LAST NAME | FIRST NAME | | MENTOR | PROTÉGÉ |
| M | P | M | P | M | P | M | P | M | P | | | | | | | |
| M | P | M | P | M | P | M | P | M | P | ALLRED | RED | BURNS | BOB | GRAY | 2 | 2 |
| M | P | M | P | M | P | M | P | M | P | BLUE | BONNIE | CARTER | CAROL | GRAY | 3 | 3 |
| M | P | M | P | M | P | M | P | M | P | CREAM | CAREN | TRUMP | TED | GRAY | 3 | 3 |
| M | P | M | P | M | P | M | P | M | P | DINGY | DOUG | ABRAHAM | ALICE | GRAY | 3 | 3 |
| M | P | M | P | M | P | M | P | M | P | EGGPLANT | EDWARD | WEED | WINNIE | GRAY | 2 | 2 |
| M | P | M | P | M | P | M | P | M | P | FRENCH | FRAN | WARNER | WAYNE | GRAY | 3 | 2 |
| 6 | 6 | 6 | 5 | 4 | 4 | 0 | 0 | 0 | 0 | GRAND TOTAL | | | | | MENTOR 16 | STUDENT 15 |

214a — DAILY MESSAGES POSTED
214b
214c
214
212
218

FIG. 2E

TRACKING MESSAGES IN A MENTORING ENVIRONMENT

This application is a continuation of U.S. patent application Ser. No. 11/559,041, entitled "TRACKING MESSAGES IN A MENTORING ENVIRONMENT," by Stella Lee Taylor, filed Nov. 13, 2006, now U.S. Pat. No. 8,510,388, issued Aug. 13, 2013, the disclosure of which is hereby incorporated herein by reference in its entirety for all purposes.

BACKGROUND

The present invention relates in general to the field of computers, and more particularly to electronic mail (e-mail). Still more particularly, the present invention relates to monitoring e-mail correspondence between a mentor and a protégé.

It is widely agreed that mentoring can lead to a lifetime of success for a youth, particularly one who may be at a higher risk of failure due to various socio-economic factors. To participate in such a worthwhile activity, many volunteers agree to mentor school-aged children through electronic mail (e-mail) correspondence. Mentors are often matched with a particular child or classroom by volunteers from a corporation, or through a social services enterprise dedicated to such activities. Unfortunately, resources usually do not allow for a thorough character and background screening of the mentors. Such lack of screening may expose a protégé child to a mentor who is ill-equipped for the job, or, at worst, is a child predator. Thus, what is needed is a method for monitoring mentor and protégé e-mail traffic, to ensure that mentors and protégés are conscientiously e-mailing back and forth, and to monitor messages for any inappropriate or alarming content.

SUMMARY

To address the need stated above, the present invention provides a method, system and computer-readable medium for tracking e-mail messages between mentors and protégés. In one embodiment, the method includes the steps of presenting to a reviewer a computer-based activity tracking form that is populated with data from an underlying relational database, wherein the underlying relational database includes a content of e-mail messages addressed to an adult mentor and a content of e-mail messages addressed to a juvenile protégé, and wherein the underlying relational database includes a status of e-mail messages between the adult mentor and juvenile protégé as determined by an e-mail interceptor; displaying a status of an e-mail, between the adult mentor and the juvenile protégé, which has been intercepted by the e-mail monitor; in response to a displayed status indicating that the e-mail has not been reviewed, blocking transmission of the e-mail to an intended recipient; and in response to the displayed status indicating that the e-mail has been reviewed, enabling transmission of the e-mail to the intended recipient. The method may also include the steps of, in response to the displayed status indicating that the e-mail contains alarming content, blocking transmission of the e-mail to the intended recipient; and transmitting a warning message to an authority figure, wherein the warning message describes the alarming content of the e-mail, a sender of the e-mail, the intended recipient of the e-mail, a date and time-stamp for the e-mail, an e-mail address of the sender, and an e-mail address of the intended recipient. The alarming content of the e-mail may be automatically determined by specific keywords in the e-mail.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

FIGS. 2a-e depict various states of an inventive activity tracking form used to monitor e-mail messages between mentors and protégés;

DETAILED DESCRIPTION OF THE PREFERRED EMBODIMENT

Figure 1A:
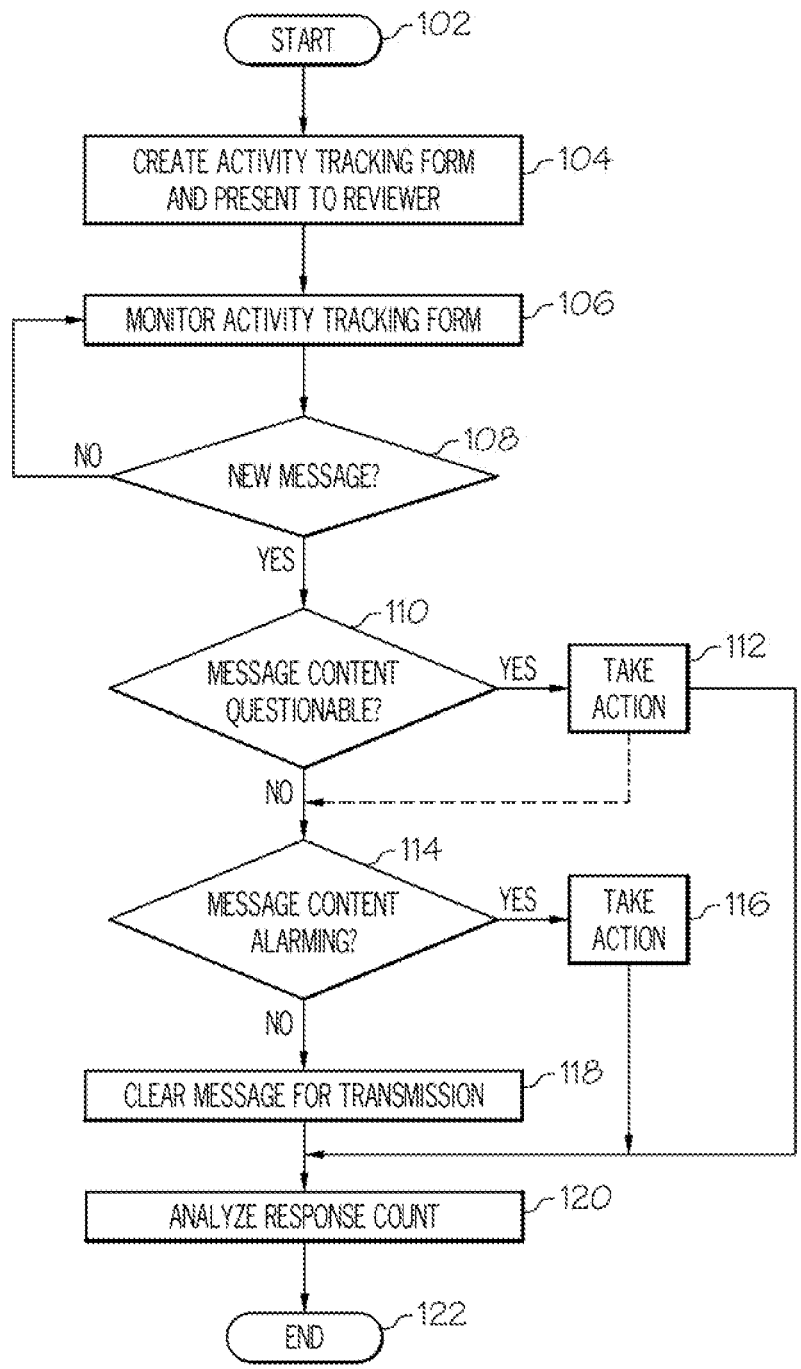
FIG. 1a is a flow-chart of exemplary steps taken to centrally monitor e-mail messages between mentors and protégés.

With reference now the figures, and in particular to FIG. 1a, a high-level flow-chart of exemplary steps taken by the present invention for monitoring e-mail traffic between mentors and protégés through the use of an activity tracking form is presented. Exemplary demonstrations of how such an activity tracking form 200 is utilized are presented in FIGS. 2a-e. FIG. 1a, however, provides a general overview of the operation of the present invention.

Figure 1B:
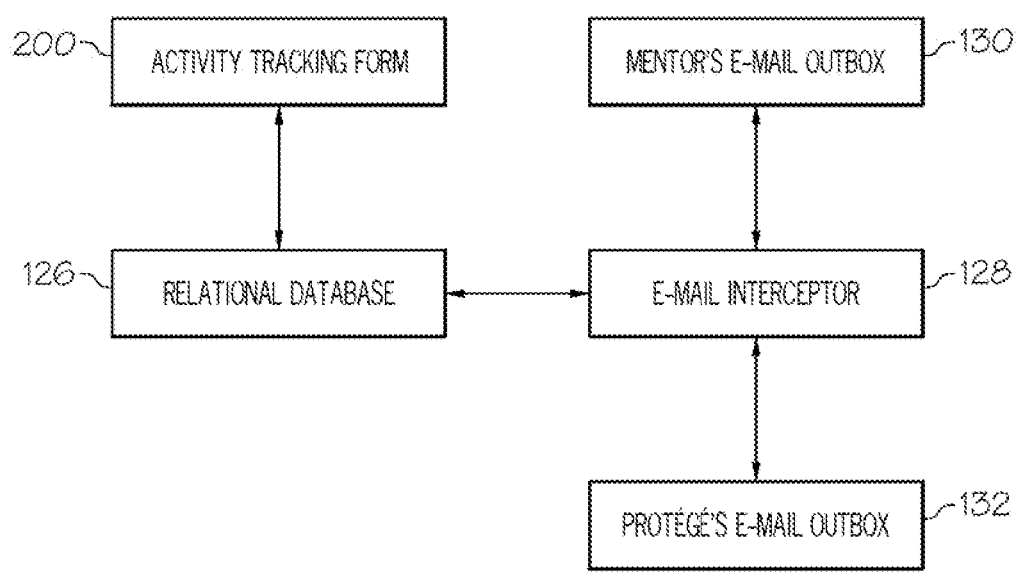
FIG. 1b describes a relationship between an e-mail intercepting logic, a relational database, and mentor and protégé e-mail outboxes.

After initiator block 102, an activity tracking form is created and then presented in a Graphical User Interface (GUI) to a reviewer (block 104). In an exemplary embodiment, the reviewer is defined as a person or computer logic that has been assigned the responsibility of monitoring e-mail traffic between mentors and protégés to ensure that an appropriate number of e-mail messages (not so few that there is no mentoring occurring, and not so many that boundaries of the mentoring process are being exceeded) are being sent, and that the content of these e-mail messages is appropriate for the mentoring program as defined. As shown in FIG. 1b, the activity tracking form 200 is linked to a relational database 126, which is populated with the content and status (as described below) of e-mail messages from a mentor's e-mail outbox 130 and a protégé's e-mail outbox 132. The status (e.g., sent, reviewed, released, flagged, etc.) of the e-mail messages is determined by logic in e-mail interceptor 128, which also provides relational database 126 with a copy, as needed, of the actual e-mail itself.

Returning back now to FIG. 1a, the activity tracking form is monitored (manually and automatically in a manner described below) by a reviewer, as stated in block 106. If a new e-message from either a mentor or a protégé is detected (query block 108), then the content of the e-mail message is evaluated as being either questionable (block 110) or alarming (block 114). An exemplary questionable message may be one in which a mentor asks a protégé for her home address, or for some other information that may or may not have legitimate usefulness within the context of the mentor/protégé relationship. An exemplary alarming message may be one in which the mentor asks sexually suggestive questions of the protégé, or one in which the protégédiscusses plans to engage in dangerous behavior (i.e., suicide, weapons, drugs, etc.). If the message content is questionable, then a reviewer will monitor more closely future e-mails between the mentor and protégé, and may take additional steps such as interviewing the mentor (block 112). The message having questionable content may or may not eventually be released for transmission (block 118).

If the message content is alarming, then the reviewer makes appropriate communication (phone call, e-mail, personal visit) with law enforcement officials, a parent, a teacher, etc., as the situation warrants (block 116), and does not release the message for transmission to the intended recipient. After reviewing an e-mail message, and after finding that the content is not questionable or alarming, then the e-mail message is cleared for transmission to the intended recipient (block 118), and the e-mail is sent to the intended recipient. At some point in time, the reviewer will analyze the activity tracking form to determine if messages are being responded to in a timely manner, if there is an appropriate number (not too few and not to many) of e-mails between a mentor and protégé, etc., as described more fully below. The process ends at terminator block 122.

With reference now to FIG. 2a, an exemplary activity tracking form 200a is presented. Activity tracking form 200a depicts data stored in an underlying relational database structure (relational database 126 shown in FIG. 1b). This relational database structure includes rules for monitoring e-mail communication, as discussed in detail below. Included in activity tracking form 200a are activity names 202, which are further broken down by sub-activities 204, which may include named and un-named activities. Under each sub-activity 204 is a separate message indicator block 214 for the Mentor (M) and the Protégé (P). Each message indicator block 214 is a single displayed cell that is assigned for a specific e-mail message according to who (Mentor "M" or Protégé "P") sent (or should send) the e-mail message. A listing of mentors 206 is associated with specific protégés 208 to whom the mentor is assigned. Optionally, the protégé's teacher's name 210 is also provided, in order to assist an e-mail reviewer who needs to contact the protégé's teacher when concerns arise due to content of e-mails between the mentor and the protégé. To aid the reviewer in monitoring activity levels of mentoring e-mail, a count of messages posted 212 is maintained in an on-going manner. Note that in its initial configuration (before any e-mails are tracked), all message indicator boxes 214 are color coded in a same color (i.e., blue).

The activity tracking form 200a shown in FIG. 2a depicts how the form will appear when first created (e.g., all message indicator boxes 214 have "M" and "P" in non-bold format, and the background color of all message indicator boxes 214 is blue). With reference now to FIG. 2b, activity tracking form 200a has changed in appearance to appear as activity tracking form 200b. This change in appearance is depicted in the message indicator boxes 214 as one or more "M" or "P" designations changing from normal to bold font, and the background color of the cell changing to an alert color (i.e., orange). This designation indicates that an e-mail has been placed in an outbox of an e-mail application used by either a mentor or a protégé, but the e-mail has not been reviewed (and thus released) by a reviewer.

Referring now to FIG. 2c, a reviewer can manually examine a content of an e-mail between a mentor and a protégé by clicking a highlighted message indicator box 214. This results in a pop-up window 216 appearing. Pop-up window 216 displays the entire content of the detected e-mail. In the example shown, the message is from Mentor Bonnie Blue to Protégé Carol Carter. In the example shown, assume that guidelines, which are set by the reviewer and the mentoring program, state that the mentor and protégé should discuss only topics such as school and general activities, as well as encouragement to the protégé. The content of the message appears to be appropriate, since it follows these guidelines. The reviewer then clicks the "Close this window" button 218, and the font and color of the message indicator box 214 related to the reviewed e-mail returns to a normal non-bold font, but with a green background to indicate that a message has been sent, reviewed and allowed to continue to the intended recipient protégé. The underlying relational database system 126, which populates and controls the activity tracking form 200, makes a note of which reviewer reviewed and released the e-mail message, as well as who created the e-mail message and who the intended recipient was. If the same mentor has subsequently posted another e-mail message (before the first e-mail message was reviewed), then the subsequent e-mail message is then automatically presented to the reviewer after the first e-mail message is either released, or (as described below) is held up.

With reference now the activity tracking form 200d shown in FIG. 2d, assume that the message indicator boxes 214 shown with a bold "X" (and preferably a red background) have been determined to contain material that is either questionable or alarming. These notations can be the result of the manual review (described in FIG. 2c), or they may be generated automatically by a scanning tool that searches all posted e-mails for specific terms, such as "suicide," "drugs," "kill," "sex," etc. to automatically spot a key term. In response to the "X" being generated (either by the manual review or the automatic term spotting), a message is sent to a pre-determined person (law enforcement officer, child protective services agent, parent, teacher, etc.). This message may be in the form of an e-mail, telephone call, etc. from the person reviewing the e-mails, or an e-mail may be automatically generated. In one embodiment a first code (e.g., a yellow background) may describe the message as having questionable content, while a second code (e.g. a red background) may describe a message that has clearly alarming content. The criteria for questionable and alarming content may be manually set by the reviewer.

With reference now to the activity tracking form 200e shown in FIG. 2e, different visual cues for different statuses of e-mail message are shown. For example, message indicator box 214a may have a green background, indicating that the message has been reviewed and released. Message indicator box 214b may have an orange background indicating that the e-mail message has not been reviewed. Message indicator box 214c may have a blue background, indicating that, although mentor Fran French has sent protégé Wayne Warner an e-mail message (which has been released), protégé Wayne Warner still has not responded with an e-mail to mentor Fran French.

Note that running totals of all e-mail messages are shown in row 218 as well as the column of messages posted 212. These totals can be calibrated to show all e-mail messages, only reviewed and approved e-mail messages, or only reviewed and flagged (as having content that is inappropriate or alarming) e-mail messages.

By reviewing the color coding and number totals, a reviewer is able to quickly see which mentor/protégé pairs are having too many or not enough correspondence, which mentor/protégé pairs show a spike in inappropriate or even alarming content in their e-mails, and which sub-activities are receiving too much or not enough e-mails. Examples of such sub-activities may be school subjects (including tutoring), career counseling (including advice on which coursework to take), personal advice (including advice on dating), etc. Hence, if a particular mentor shows an unusually high level of e-mail in the sub-category of "personal advice" (as catalogued according to the content of the e-mail), this may trigger a flag to the reviewer to more closely monitor that mentor's e-mails. Furthermore, if categorization of the e-mail is made by the mentor, and if the mentor repeatedly mis-categorizes "personal advice" as "career counseling," this may also trigger a flag for the reviewer to closely watch the mentor's activities.

Figure 3:
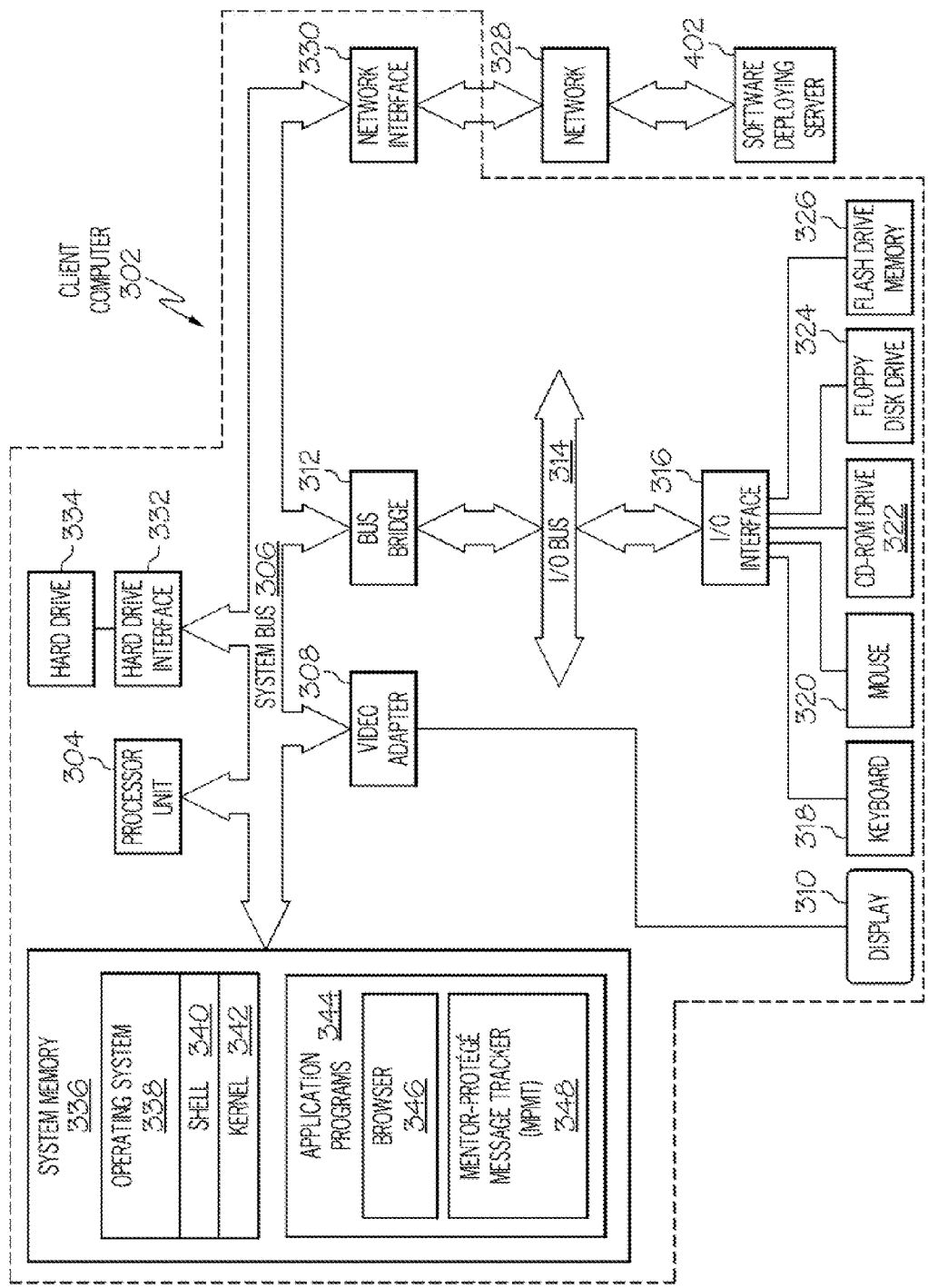
FIG. 3 depicts an exemplary client computer that can be utilized in accordance with the present invention.

With reference now to FIG. 3, there is depicted a block diagram of an exemplary client computer 302, in which the present invention may be utilized. Client computer 302 includes a processor unit 304 that is coupled to a system bus 306. A video adapter 308, which drives/supports a display 310, is also coupled to system bus 306. System bus 306 is coupled via a bus bridge 312 to an Input/Output (I/O) bus 314. An I/O interface 316 is coupled to I/O bus 314. I/O interface 316 affords communication with various I/O devices, including a keyboard 318, a mouse 320, a Compact Disk-Read Only Memory (CD-ROM) drive 322, a floppy disk drive 324, and a flash drive memory 326. The format of the ports connected to I/O interface 316 may be any known to those skilled in the art of computer architecture, including but not limited to Universal Serial Bus (USB) ports.

Client computer 302 is able to communicate with a software deploying server 402 via a network 328 using a network interface 330, which is coupled to system bus 306. Network 328 may be an external network such as the Internet, or an internal network such as an Ethernet or a Virtual Private Network (VPN).

A hard drive interface 332 is also coupled to system bus 306. Hard drive interface 332 interfaces with a hard drive 334. In a preferred embodiment, hard drive 334 populates a system memory 336, which is also coupled to system bus 306. System memory is defined as a lowest level of volatile memory in client computer 302. This volatile memory includes additional higher levels of volatile memory (not shown), including, but not limited to, cache memory, registers and buffers. Data that populates system memory 336 includes client computer 302's operating system (OS) 338 and application programs 344.

OS 338 includes a shell 340, for providing transparent user access to resources such as application programs 344. Generally, shell 340 is a program that provides an interpreter and an interface between the user and the operating system. More specifically, shell 340 executes commands that are entered into a command line user interface or from a file. Thus, shell 340 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 342) for processing. Note that while shell 340 is a text-based, line-oriented user interface, the present invention will equally well support other user interface modes, such as graphical, voice, gestural, etc.

As depicted, OS 338 also includes kernel 342, which includes lower levels of functionality for OS 338, including providing essential services required by other parts of OS 338 and application programs 344, including memory management, process and task management, disk management, and mouse and keyboard management.

Application programs 344 include a browser 346. Browser 346 includes program modules and instructions enabling a World Wide Web (WWW) client (i.e., client computer 302) to send and receive network messages to the Internet using HyperText Transfer Protocol (HTTP) messaging, thus enabling communication with software deploying server 402.

Application programs 344 in client computer 302's system memory also include a Mentor-Protégé Message Tracker (MPMT) 348. MPMT 348 includes code for implementing the processes described in FIGS. 1a-2e. In one embodiment, client computer 302 is able to download MPMT 348 from software deploying server 402.

The hardware elements depicted in client computer 302 are not intended to be exhaustive, but rather are representative to highlight essential components required by the present invention. For instance, client computer 302 may include alternate memory storage devices such as magnetic cassettes, Digital Versatile Disks (DVDs), Bernoulli cartridges, and the like. These and other variations are intended to be within the spirit and scope of the present invention.

Figure 4:
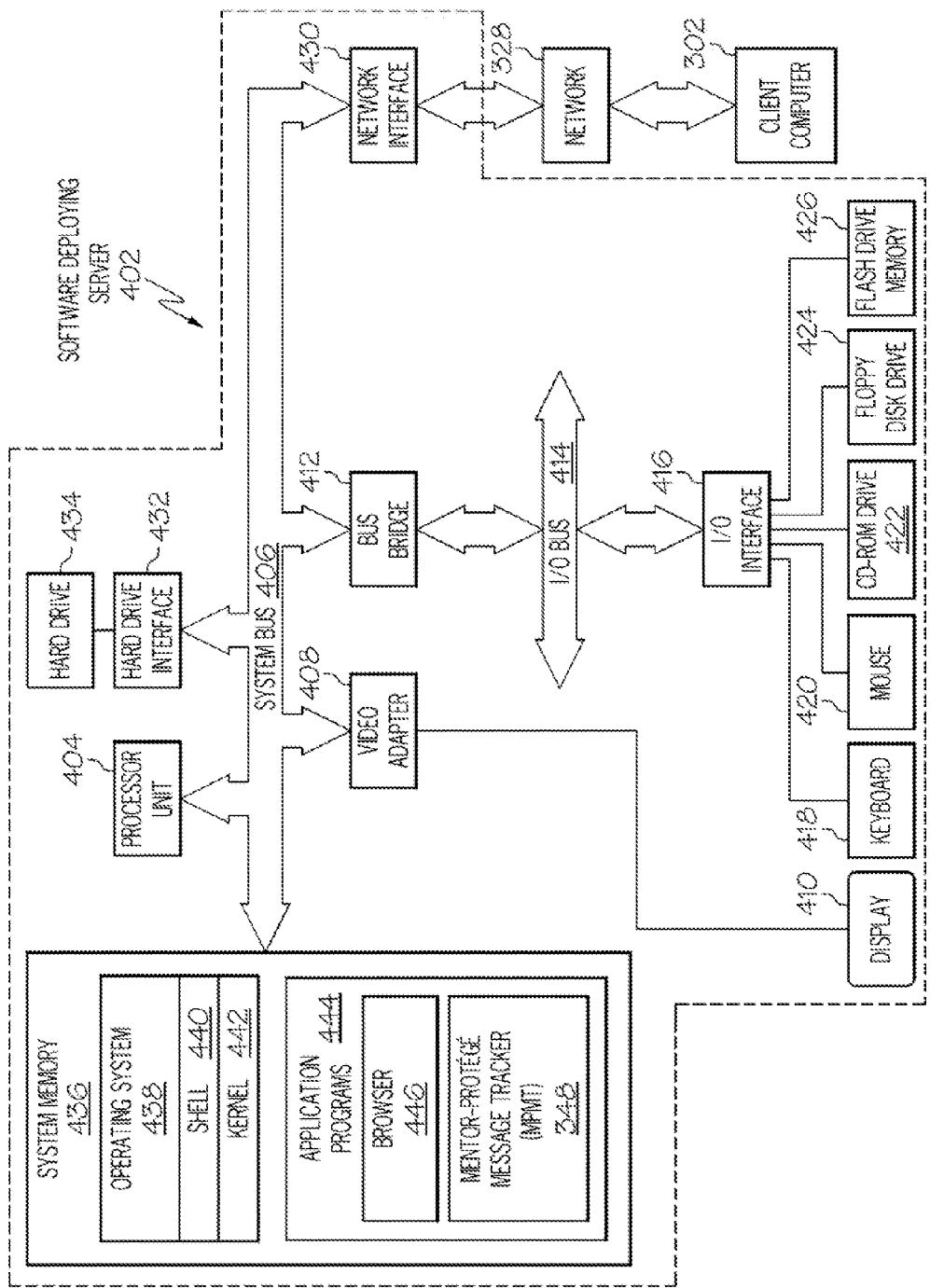
FIG. 4 illustrates a software deploying server that is capable of deploying software to the client computer shown in FIG. 3 to implement the present invention.

As noted above, MPMT 348 can be downloaded to client computer 302 from software deploying server 402, shown in exemplary form in FIG. 4. Software deploying server 402 includes a processor unit 404 that is coupled to a system bus 406. A video adapter 408 is also coupled to system bus 406. Video adapter 408 drives/supports a display 410. System bus 406 is coupled via a bus bridge 412 to an Input/Output (I/O) bus 414. An I/O interface 416 is coupled to I/O bus 414. I/O interface 416 affords communication with various I/O devices, including a keyboard 418, a mouse 420, a Compact Disk-Read Only Memory (CD-ROM) drive 422, a floppy disk drive 424, and a flash drive memory 426. The format of the ports connected to I/O interface 416 may be any known to those skilled in the art of computer architecture, including but not limited to Universal Serial Bus (USB) ports.

Software deploying server 402 is able to communicate with client computer 302 via network 328 using a network interface 430, which is coupled to system bus 406. Access to network 328 allows software deploying server 402 to deploy MPMT 348 to client computer 302.

System bus 406 is also coupled to a hard drive interface 432, which interfaces with a hard drive 434. In a preferred embodiment, hard drive 434 populates a system memory 436, which is also coupled to system bus 406. Data that populates system memory 436 includes software deploying server 402's operating system 438, which includes a shell 440 and a kernel 442. Shell 440 is incorporated in a higher level operating system layer and utilized for providing transparent user access to resources such as application programs 444, which include a browser 446, and a copy of MPMT 348 described above, which can be deployed to client computer 302.

The hardware elements depicted in software deploying server 402 are not intended to be exhaustive, but rather are representative to highlight essential components required by the present invention. For instance, software deploying server 402 may include alternate memory storage devices such as flash drives, magnetic cassettes, Digital Versatile Disks (DVDs), Bernoulli cartridges, and the like. These and other variations are intended to be within the spirit and scope of the present invention.

Note further that, in a preferred embodiment of the present invention, software deploying server 402 performs all of the functions associated with the present invention (including execution of MPMT 348), thus freeing client computer 302 from having to use its own internal computing resources to execute MPMT 348.

Note that the architecture shown in detail in FIGS. 3-4 may be used by client computer 136, data server 138 and/or services server 130 shown in FIG. 1. Note further that services server 130 may function as a software deploying server 402, whose function is described herein.

It should be understood that at least some aspects of the present invention may alternatively be implemented in a computer-useable medium that contains a program product. Programs defining functions on the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), and communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

Software Deployment

As described above, in one embodiment, the processes described by the present invention, including the functions of MPMT 348, are performed by service provider server 402. Alternatively, MPMT 348 and the method described herein, and in particular as shown and described in FIGS. 2*a-b*, can be deployed as a process software from service provider server 402 to client computer 302. Still more particularly, process software for the method so described may be deployed to service provider server 402 by another service provider server (not shown).

Figure 5A:
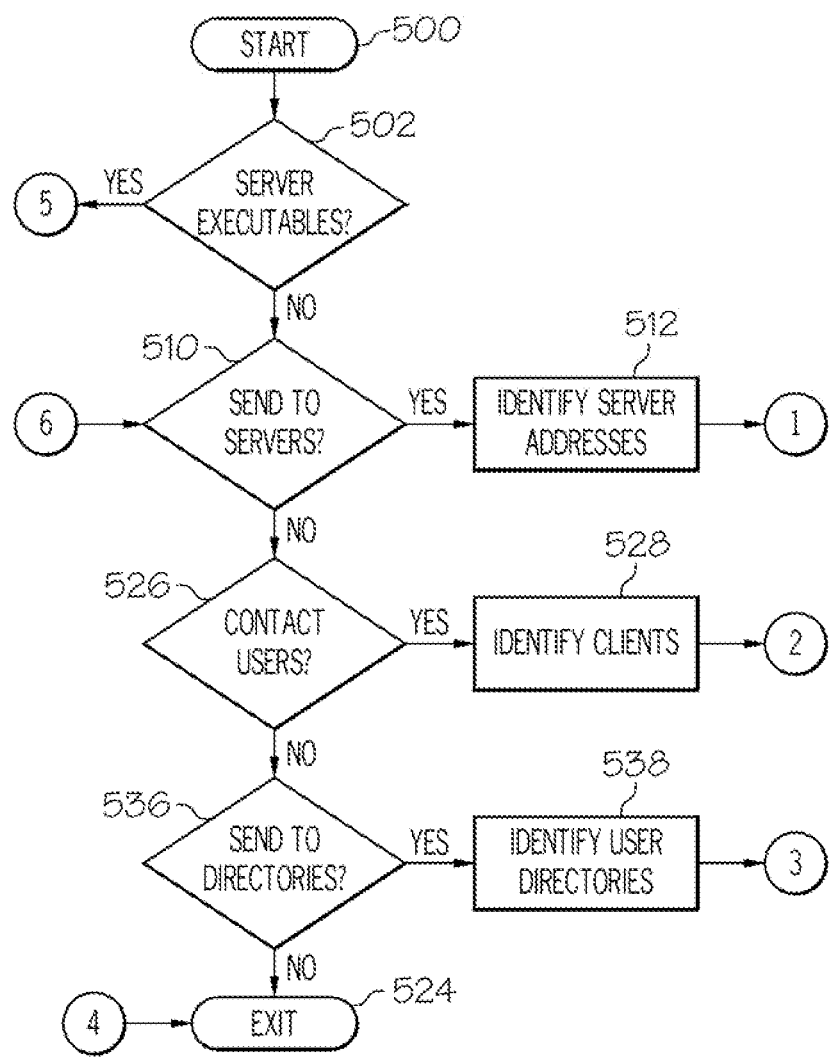
FIGS. 5a-b are flow-chart showing steps taken to deploy software capable of executing the steps described in FIGS. 1a-2e.
Figure 5B:
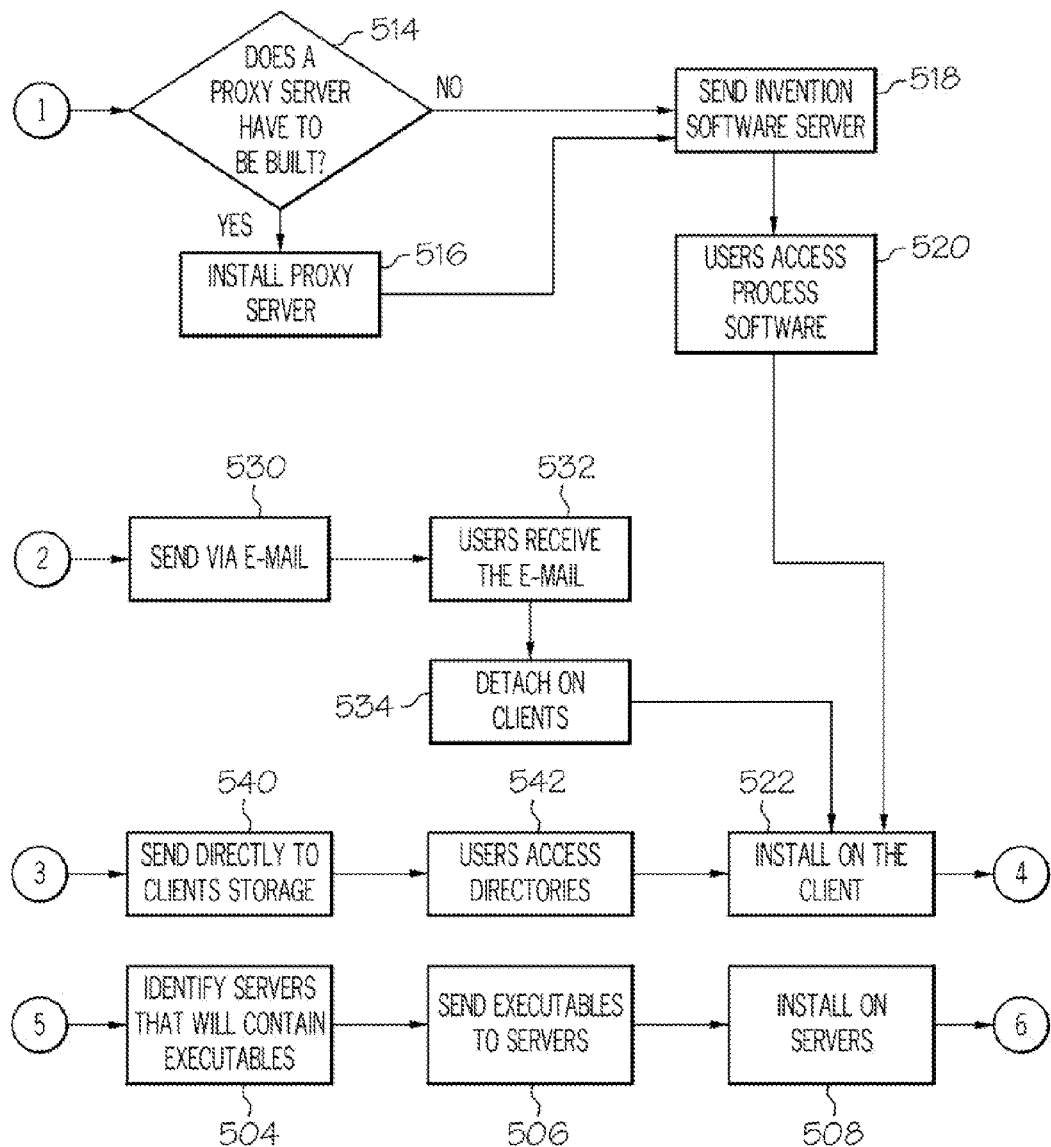

Referring then to FIGS. 5*a-b*, step 500 begins the deployment of the process software. The first thing is to determine if there are any programs that will reside on a server or servers when the process software is executed (query block 502). If this is the case, then the servers that will contain the executables are identified (block 504). The process software for the server or servers is transferred directly to the servers' storage via File Transfer Protocol (FTP) or some other protocol or by copying though the use of a shared file system (block 506). The process software is then installed on the servers (block 508).

Next, a determination is made on whether the process software is to be deployed by having users access the process software on a server or servers (query block 510). If the users are to access the process software on servers, then the server addresses that will store the process software are identified (block 512).

A determination is made if a proxy server is to be built (query block 514) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (block 516). The process software is sent to the servers either via a protocol such as FTP or it is copied directly from the source files to the server files via file sharing (block 518). Another embodiment would be to send a transaction to the servers that contained the process software and have the server process the transaction, then receive and copy the process software to the server's file system. Once the process software is stored at the servers, the users via their client computers, then access the process software on the servers and copy to their client computers file systems (block 520). Another embodiment is to have the servers automatically copy the process software to each client and then run the installation program for the process software at each client computer. The user executes the program that installs the process software on his client computer (block 522) then exits the process (terminator block 524).

In query step 526, a determination is made whether the process software is to be deployed by sending the process software to users via e-mail. The set of users where the process software will be deployed are identified together with the addresses of the user client computers (block 528). The process software is sent via e-mail to each of the users' client computers (block 530). The users then receive the e-mail (block 532) and then detach the process software from the e-mail to a directory on their client computers (block 534). The user executes the program that installs the process software on his client computer (block 522) then exits the process (terminator block 524).

Lastly a determination is made as to whether the process software will be sent directly to user directories on their client computers (query block 536). If so, the user directories are identified (block 538). The process software is transferred directly to the user's client computer directory (block 540). This can be done in several ways such as but not limited to sharing of the file system directories and then copying from the sender's file system to the recipient user's file system or alternatively using a transfer protocol such as File Transfer Protocol (FTP). The users access the directories on their client file systems in preparation for installing the process software (block 542). The user executes the program that installs the process software on his client computer (block 522) and then exits the process (terminator block 524).

VPN Deployment

The present software can be deployed to third parties as part of a service wherein a third party VPN service is offered as a secure deployment vehicle or wherein a VPN is build on-demand as required for a specific deployment.

A virtual private network (VPN) is any combination of technologies that can be used to secure a connection through an otherwise unsecured or untrusted network. VPNs improve security and reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e. the software resides elsewhere) wherein the lifetime of the VPN is limited to a given period of time or a given number of deployments based on an amount paid.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider (ESP) sets a network access server (NAS) and provides the remote users with desktop client software for their computers. The telecommuters can then dial a toll-free number or attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a company's multiple fixed sites over a public network such as the Internet.

The process software is transported over the VPN via tunneling which is the process of placing an entire packet within another packet and sending it over a network. The protocol of the outer packet is understood by the network and both points, called runnel interfaces, where the packet enters and exits the network.

Software Integration

The process software which consists code for implementing the process described herein may be integrated into a client, server and network environment by providing for the process software to coexist with applications, operating systems and network operating systems software and then installing the process software on the clients and servers in the environment where the process software will function.

The first step is to identify any software on the clients and servers including the network operating system where the process software will be deployed that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists match the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

On Demand

The process software is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the assessed server may make requests of other servers that require CPU units. CPU units are an example that represents but one measurement of use. Other measurements of use include but are not limited to network bandwidth, memory utilization, storage utilization, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory utilization, storage utilization, etc. approach a capacity so as to affect performance, additional network bandwidth, memory utilization, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 6A:
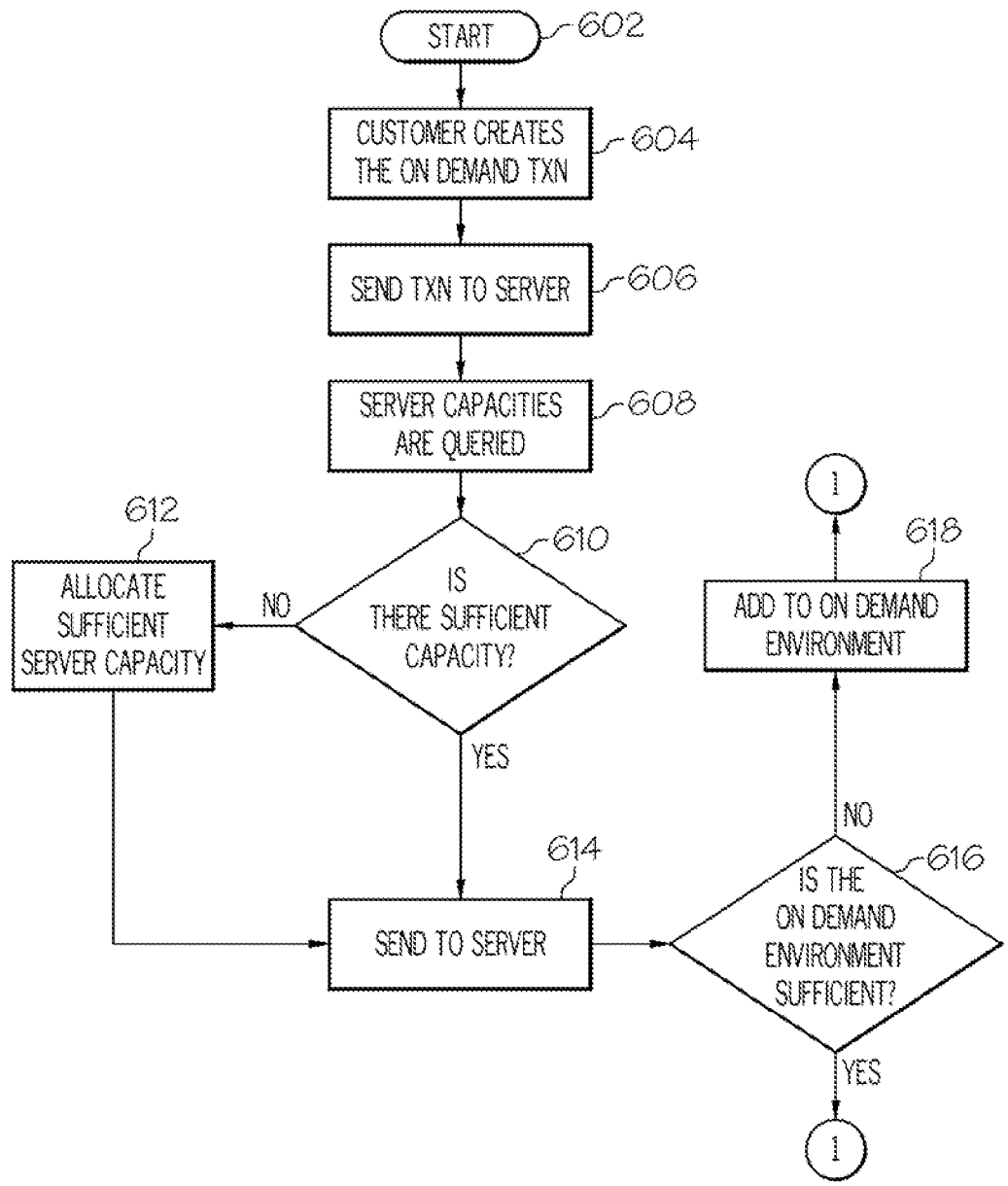
FIGS. 6a-b are flow-charts showing steps taken to execute the steps shown in FIGS. 1a-2e using an on-demand service provider.
Figure 6B:
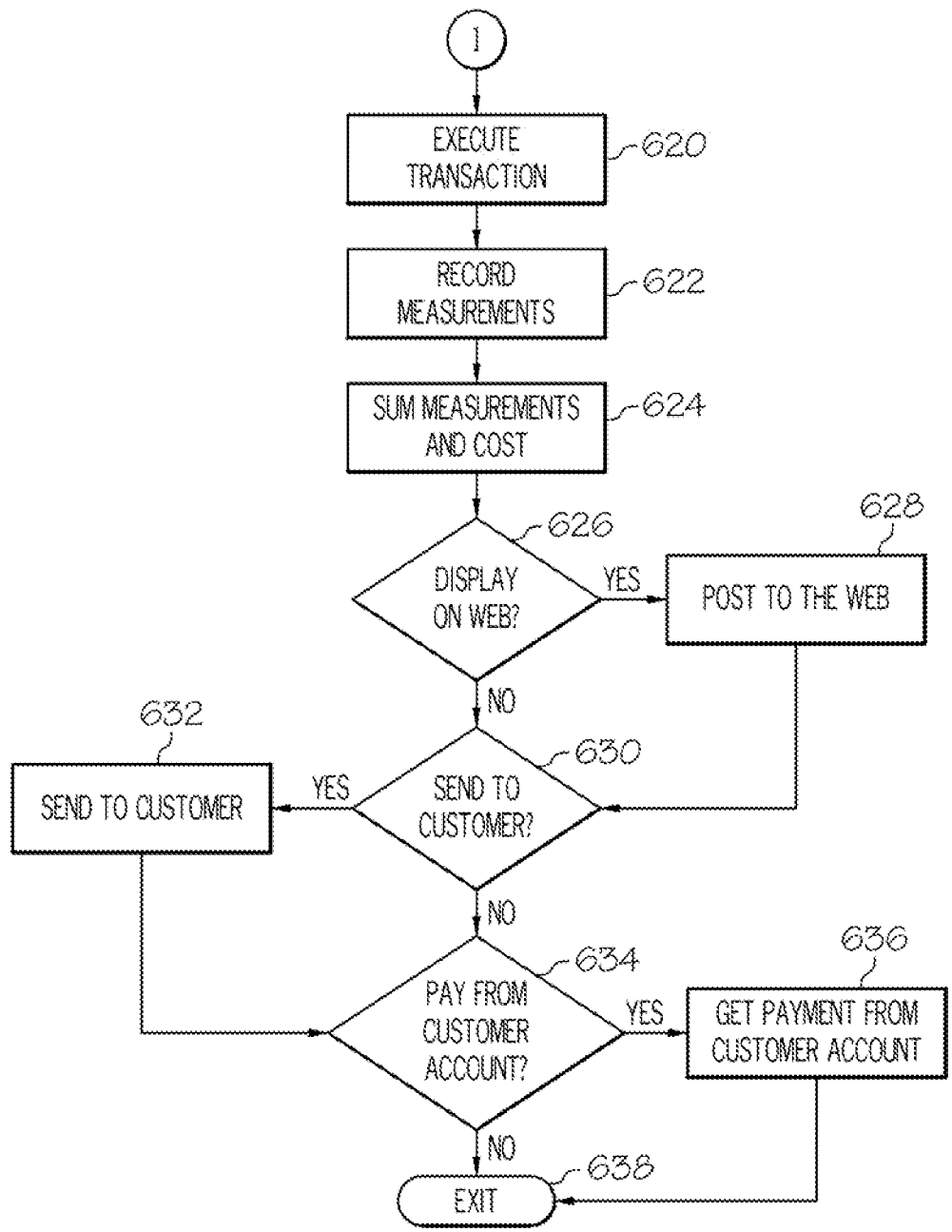

With reference now to FIGS. 6*a-b*, initiator block 602 begins the On Demand process. A transaction is created than contains the unique customer identification, the requested service type and any service parameters that further, specify the type of service (block 604). The transaction is then sent to the main server (block 606). In an On Demand environment the main server can initially be the only server, then as capacity is consumed other servers are added to the On Demand environment.

The server central processing unit (CPU) capacities in the On Demand environment are queried (block 608). The CPU requirement of the transaction is estimated, then the servers available CPU capacity in the On Demand environment are compared to the transaction CPU requirement to see if there is sufficient CPU available capacity in any server to process the transaction (query block 610). If there is not sufficient server CPU available capacity, then additional server CPU capacity is allocated to process the transaction (block 612). If there was already sufficient Available CPU capacity then the transaction is sent to a selected server (block 614).

Before executing the transaction, a check is made of the remaining On Demand environment to determine if the environment has sufficient available capacity for processing the transaction. This environment capacity consists of such things as but not limited to network bandwidth, processor memory, storage etc. (block 616). If there is not sufficient available capacity, then capacity will be added to the On Demand environment (block 618). Next the required software to process the transaction is accessed, loaded into memory, then the transaction is executed (block 620).

The usage measurements are recorded (block 622). The utilization measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer (block 624).

If the customer has requested that the On Demand costs be posted to a web site (query block 626), then they are posted (block 628). If the customer has requested that the On Demand costs be sent via e-mail to a customer address (query block 630), then these costs are sent to the customer (block 632). If the customer has requested that the On Demand costs be paid directly from a customer account (query block 634), then payment is received directly from the customer account (block 636). The On Demand process is then exited at terminator block 638.

Method Invoking Rules

The methods described herein may be invoked by one or more rules. These rules may be specific for a resource, a network, an enterprise, or any other resource partition at any granularity. The rule can optionally be initiated by a policy. Resources are defined to include hardware resources as well as software resources.

Figure 7A:
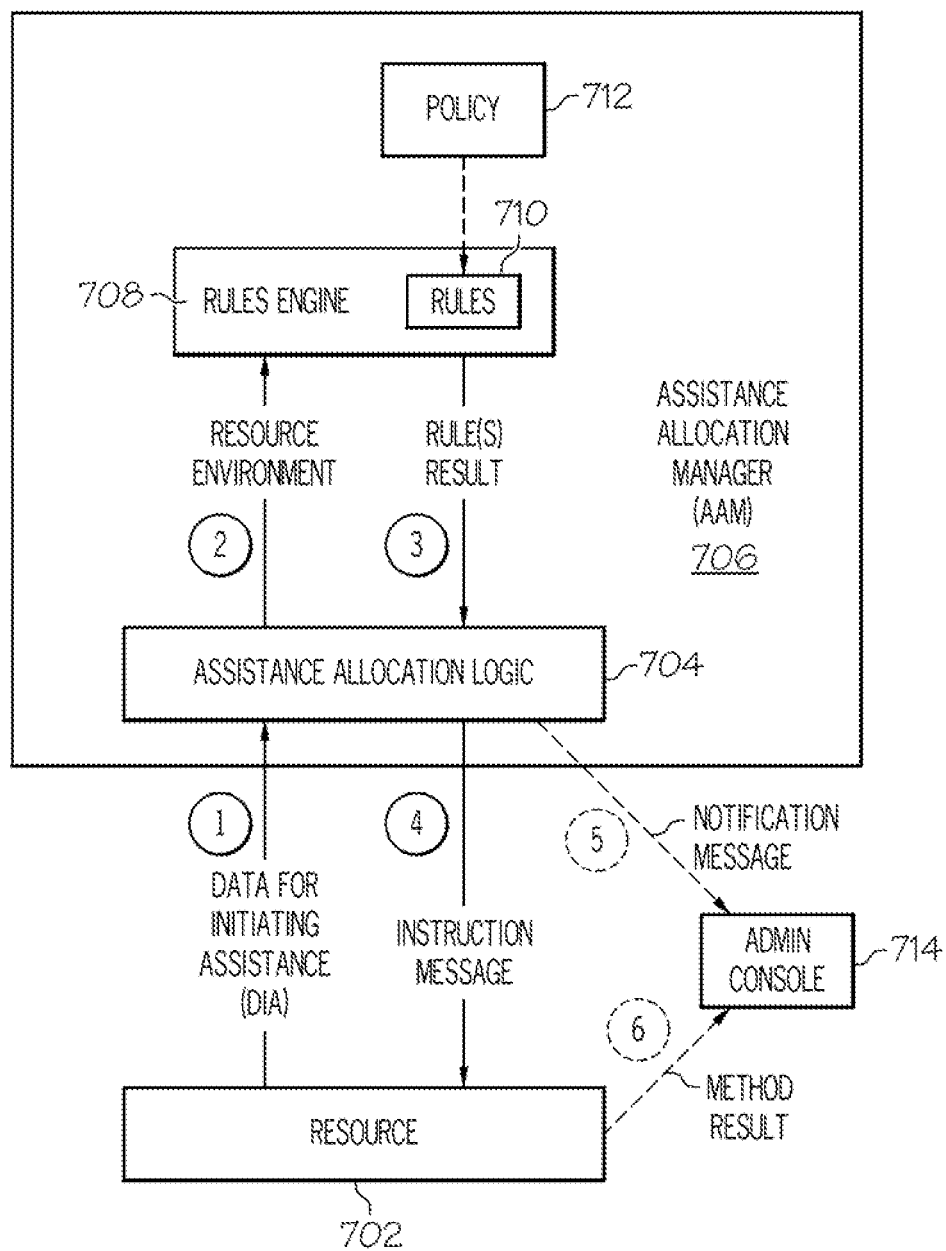
FIGS. 7a-b illustrates a process for utilizing one or more rules to invoke the methods described by the present invention.

For example, consider the infrastructure and process shown in FIG. 7a. As shown in Step 1 (depicted as a circle around the numeral "1"), a resource 702 sends Data for Initiating Assistance (DIA) to an Assistance Allocation Logic (AAL) 704 in an Assistance Allocation Manager (AAM) 706. The DIA may be a request for another resource, such as a particular Webpage, a portal resource (including portlets, etc.), a control instruction, etc. The DIA may also be performance data that is pushed or pulled from the resource 702. That is, resource 702 may issue a DIA requesting delivery of web content, execution of a server-based application, access to a particular website or a particular software resource, including an application, a method/class, a portlet, etc. In addition (or alternatively), the DIA may be performance data, such as data that describes Central Processor Unit (CPU) usage, clock speed, hardware temperature, the number of users (actual or allocated) of the resource, etc. Such examples of types of DIA are exemplary only, and are not to limit the scope of the definition of a DIA.

When AAL 704 receives a DIA, AAL 704 retrieves environment information, which includes state information available to the AAL (e.g., time of day) and data included in the DIA. The resource environment information includes, but is not limited to, the type of DIA (request for a resource, performance data, etc.), an identifier for the resource that sent the DIA, current state conditions of other resources managed by AAM 706, current policies being implemented by an enterprise, etc. The DIA type may be determined by a request type indicator that is part of the DIA (indicating that the DIA is for a request for resource(s), performance data, etc.), or the DIA may be linked to metadata that supplies, identifies, and describes the DIA type.

The DIA, together with any other environmental context (e.g., time of day, the current load on AAM 706, etc.), combine to form resource environment information, which is made accessible to a rules engine 708, as shown at Step 2. Rules engine 708 includes a library of rules 710, which may be expressed as compiled code (e.g., Java™ bytecodes) that ultimately causes resource 702 to execute the steps of the inventive method described above. Other well-known forms of rule expression are also possible. (For example, the Extensible Access Control Markup Language (XACML) standard ratified by the Organization for the Advancement of Structured Information Standards (OASIS) standards body, defines an exemplary form for such a rule expression.) Note that the creation of the rules 710 may be initiated by and responsive to a policy 712. Policy 712 is a (preferably enterprise-wide) policy that describes, in non-technical language, how one or more resources are to be utilized. Policy 712 may be formulated by a person or software logic associated with AAM 706, resource 702, or any other entity (including the enterprise that utilizes resource 702), which has the authority to influence the formulation of the rules 710.

Rules engine 708 evaluates one or more rules 710 in the current environmental context described above. After evaluating the appropriate rule(s) 710 for the current environmental context, rules engine 708 generates a rule(s) result, which is sent from rules engine 708 to AAL 704 (as shown in Step 3). The rule(s) result of Step 3 provides adequate cues for AAL 704 to generate an instruction message for resource 702 (Step 4). This instruction message for resource 702 may be a method call, source code, compiled code, binaries, applets, etc., which are executable by resource 702 to implement the steps of the inventive method described above, or the instruction message may simply set a flag, bit, or other data in resource 702 that will result in resource 702 taking the appropriate steps necessary to implement the inventive method (e.g., calling another resource, initiating a local action, etc.). Note that, as shown in Step 5, an admin console 714 may optionally be notified, concurrently or non-concurrently with Step 4, that resource 702 has received the instruction message. This notification message may include details that include, but are not limited to, DIA information, resource environment information, rule(s) results, as well as results of the inventive method being implemented in resource 702 (Step 6).

Figure 7B:
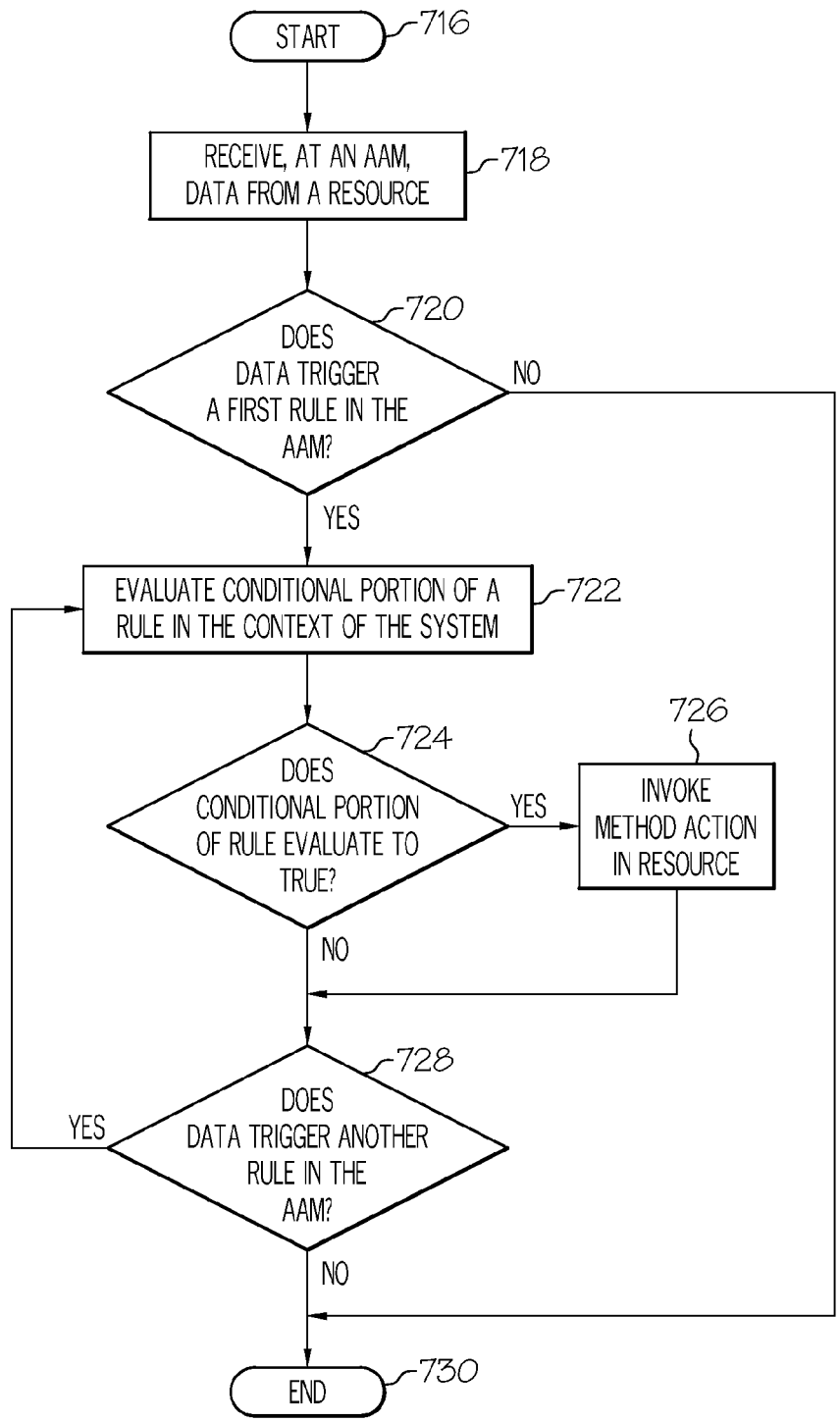

With reference now to FIG. 7b, a flow-chart of exemplary steps taken to invoke a method by a rule is presented. After initiator block 716, an Assistance Allocation Manager (AAM) receives data (e.g., Data for Initiating Assistance— DIA) from a resource (block 718). The AAM may be a web-based service, such as that offered by IBM® Global Services® (IGS™), using a Service Oriented Architecture (SOA) software service such as IBM's Websphere®. The SOA software includes a bottom level of applications (pieces of code that perform some useful function), a middle level of Web services (infrastructure for accessing the applications), and a top layer of business processes (steps taken to call the Web services). Thus, in a preferred embodiment, the AAM is a third party service that manages resources for a customer.

Continuing with FIG. 7b, an evaluation of the DIA is made to determine if the DIA triggers (invokes) a first rule in the AAM (block 720). If so, then a conditional portion of the first rule is evaluated in the context of the system (block 722). As discussed above, the context of the system may include real-time status conditions for the resource (e.g., time, date, current operating condition, number of current users, CPU usage, memory load, etc.). As described in query block 724, if the conditional portion of the called rule evaluates to "TRUE," (i.e., the DIA invokes the rule), then the present invention's method steps are invoked for, and executed in, the resource (block 726). Preferably, rules stored in the AAM are associated with flags that indicate whether one or more rules may be called by a single DIA. Thus, if a flag in the AAM is set to permit multiple rules to be invoked by a single DIA, then an evaluation is made to determine if another rule is invoked by the receipt of the DIA (query block 728). If so, then such other rules are evaluated in an iterative manner as just described until there are no more applicable rules to be invoked (termination block 730).

As described here, the present invention provides Administrators/Reviewers of a Mentoring Program with an opportunity to save steps in their process of tracking and reviewing messages by having a method and a web-based system that they can use to manage the tracking and reviewing of messages for one or more groups of individuals. To this end, the present invention:

Uses an Activity Tracking Form specifically designed to track and review program/project activities Can be used by any size group or groups of individuals in any profession Allows the Reviewer to immediately view data on the screen that indicates when new messages have been posted to the system Allows the Reviewer to view the names of the individuals posting the messages along with the calculations associated with those messages.

Provides immediate data on not only the individuals that posted new messages but also those who have not posted a message.

Includes the ability to view messages for appropriate content based on a pop-up feature.

Provides report features that allow individual e-mail addresses to be pulled automatically to create a distribution list of the individuals that have not posted messages.

Includes automatically generated Reminder Messages.

Builds in an additional cell feature that ensures that all messages have been reviewed. This feature would be viewed as critical in situations where the groups using this invention are working with schools, universities or other groups dealing with sensitive information.

Thus, as described here, the present invention reduces the number of process steps necessary to track and review messages in a mentoring tool through the use of a novel Activity Tracking Form. A supervisor/reviewer of mentoring activities is provided immediate information on how many new messages have been posted, who posted those messages, and how many of the new messages have not had a content review. Reporting functions will allow the system to store and retrieve a list of e-mail addresses that can be used to create a distribution. That list is to be used specifically to produce automatically generated notifications that are sent to select individuals who are slow to post new messages or to remind participants of messages that are due within a specific time frame.

Note that while the present invention has been described in the context of a student mentoring environment, the Activity Tracking form can be used by any business, community or social group in which a mentoring program is utilized. For example, while alarming content has been described in the context of an adult mentor and a juvenile protégé, alarming content in the context of a system that tracks corporate e-mails would monitor keywords related to trade secrets, while alarming content in the context of a national security system would track monitored e-mails for the use of national security keywords (e.g., "bomb," "hijack," etc.).

The present invention thus provides for a method, system and computer-readable medium for monitoring e-mail messages between an adult mentor and a juvenile protégé. In one embodiment, the method comprises: presenting to a reviewer a computer-based activity tracking form that is populated with data from an underlying relational database, wherein the underlying relational database includes a content of e-mail messages addressed to an adult mentor and a content of e-mail messages addressed to a juvenile protégé, and wherein the underlying relational database includes a status of e-mail messages between the adult mentor and juvenile protégé as determined by an e-mail interceptor; displaying a status of an e-mail, between the adult mentor and the juvenile protégé, which has been intercepted by the e-mail monitor; in response to a displayed status indicating that the e-mail has not been reviewed, blocking transmission of the e-mail to an intended recipient; and in response to the displayed status indicating that the e-mail has been reviewed, enabling transmission of the e-mail to the intended recipient. The method may also include the steps of, in response to the displayed status indicating that the e-mail contains alarming content, blocking transmission of the e-mail to the intended recipient; and transmitting a warning message to an authority figure, wherein the warning message describes the alarming content of the e-mail, a sender of the e-mail, the intended recipient of the e-mail, a date and time-stamp for the e-mail, an e-mail address of the sender, and an e-mail address of the intended recipient. The alarming content of the e-mail may be automatically determined by specific keywords in the e-mail. The method may further include the steps of tracking a total number of e-mail messages transmitted between a specific adult mentor and a juvenile protégé; and in response to the total number of e-mail messages exceeding a predetermined number, sending a warning message to an authority figure, wherein the warning message describes a sender of the e-mail, the intended recipient of the e-mail, an e-mail address of the sender, and an e-mail address of the intended recipient. A display of a status of a specific e-mail message between the adult mentor and the juvenile protégé may be color-coded in a single displayed cell that is assigned for the specific e-mail message, wherein each single displayed cell identifies a sender of the specific e-mail message. Each single displayed cell may have a color-coded background, wherein a color-coded background of orange indicates that an e-mail message has been sent but not reviewed, green indicates that an e-mail message has been sent and reviewed, and red indicates that an e-mail message has been reviewed and blocked because of alarming content in the e-mail message. In another embodiment, the method further includes the steps of receiving, by an Assistance Allocation Manager (AAM), a Data for Initiating Assistance (DIA) from a resource in a data processing system; and in response to receiving the DIA, executing a rule, in the AAM, that is specific for the DIA and the resource that sent the DIA, wherein executing the rule in the AAM causes the steps described in claim 1 to be executed for the resource that sent the DIA.

In another embodiment, the method can be utilized to monitor e-mail traffic between any sender and any intended recipient. Thus, exemplary inventive steps include presenting to a reviewer a computer-based activity tracking form that is populated with data from an underlying relational database, wherein the underlying relational database includes a content of e-mail messages between a sender and a receiver, and wherein the underlying relational database includes a status of e-mail messages between the sender and the receiver as determined by an e-mail interceptor; displaying a status of an e-mail that has been intercepted by the e-mail monitor; in response to a displayed status indicating that the e-mail has not been reviewed, blocking transmission of the e-mail to the receiver; in response to the displayed status indicating that the e-mail has been reviewed, enabling transmission of the e-mail to the receiver; in response to the displayed status indicating that the e-mail contains alarming content, blocking transmission of the e-mail to the receiver; and transmitting a warning message to an authority figure, wherein the warning message describes the alarming content of the e-mail, a sender of the e-mail, the intended recipient of the e-mail, a date and time-stamp for the e-mail, an e-mail address of the sender, and an e-mail address of the intended recipient.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

What is claimed is:

1. A method for monitoring e-mail messages between an adult mentor and a juvenile protégé to ensure proper mentoring, the method comprising the process steps of:
   presenting to a reviewer a computer-based activity tracking form that is populated with data from an underlying relational database, wherein the underlying relational database includes a content of e-mail messages addressed to the adult mentor from the juvenile protégé and a content of e-mail messages addressed to the juvenile protégé from the adult mentor, and wherein the underlying relational database includes a status of e-mail messages between the adult mentor and the juvenile protégé as determined by an e-mail interceptor;
   displaying, on a video display device, a status of an e-mail, between the adult mentor and the juvenile protégé, which has been intercepted by the e-mail interceptor;
   in response to the displayed status indicating that the e-mail has not been reviewed by the reviewer, blocking transmission of the e-mail to an intended recipient of the e-mail;
   in response to the displayed status indicating that the e-mail has been reviewed by the reviewer, enabling transmission of the e-mail to the intended recipient;
   tracking a total number of e-mail messages transmitted between the adult mentor and the juvenile protégé;
   in response to a determination that the total number of e-mail messages transmitted exceeds a predetermined number, sending a warning message to an authority figure;
   in response to a determination that the total number of e-mail messages is less than another predetermined number, sending the warning message to the authority figure, wherein the warning message describes a sender of the e-mail, the intended recipient of the e-mail, an e-mail address of the sender, and an e-mail address of the intended recipient; and
   displaying, on the video display device, a color-coded status of a specific e-mail message between the adult mentor and the juvenile protégé in a single displayed cell that is assigned for the specific e-mail message, wherein the single displayed cell identifies a sender of the specific e-mail message, wherein the single displayed cell has a color-coded background of orange, green or red, and wherein a color-coded background of: orange indicates that the specific e-mail message has been sent but not reviewed, green indicates that the specific e-mail message has been sent and reviewed, and red indicates that the specific e-mail message has been reviewed and blocked because of alarming content in the specific e-mail message,
   wherein the method further comprises the following initial steps executed prior to the process steps:
      receiving, by an Assistance Allocation Manager (AAM), a Data for Initiating Assistance (DIA) from a hardware resource in a data processing system; and
      in response to said receiving the DIA, executing a rule in the AAM, wherein the DIA comprises computer performance data including Central Processor Unit (CPU) usage, clock speed, hardware temperature, and a total number of actual or allocated users of the hardware resource, wherein the rule in the AAM is specific to the performance data in the DIA and the hardware resource that sent the DIA, and wherein said executing the rule in the AAM causes the process steps to be executed for the hardware resource that sent the DIA.

2. The method of claim 1, further comprising:
   in response to the displayed status indicating that the e-mail contains alarming information, blocking transmission of the e-mail to the intended recipient; and
   transmitting the warning message to an authority figure, wherein the warning message describes the information in the e-mail, a sender of the e-mail, the intended recipient of the e-mail, a date and time-stamp for the e-mail, an e-mail address of the sender, and an e-mail address of the intended recipient.

3. The method of claim 2, wherein alarming information in the e-mail is automatically determined by specific keywords in the e-mail.

4. A computer-readable hardware storage device embodying computer program code for monitoring e-mail messages between an adult mentor and a juvenile protégé to ensure proper mentoring, the computer program code comprising computer executable instructions configured to be executed by a computer processor to perform a method comprising the process steps of:

presenting to a reviewer a computer-based activity tracking form that is populated with data from an underlying relational database, wherein the underlying relational database includes a content of e-mail messages addressed to the adult mentor from the juvenile protégé and a content of e-mail messages addressed to the juvenile protégé from the adult mentor, and wherein the underlying relational database includes a status of e-mail messages between the adult mentor and the juvenile protégé as determined by an e-mail interceptor;

displaying, on a video display device, a status of an e-mail, between the adult mentor and the juvenile protégé, which has been intercepted by the e-mail interceptor;

in response to the displayed status indicating that the e-mail has not been reviewed by the reviewer, blocking transmission of the e-mail to an intended recipient of the e-mail;

in response to the displayed status indicating that the e-mail has been reviewed by the reviewer, enabling transmission of the e-mail to the intended recipient;

tracking a total number of e-mail messages transmitted between the adult mentor and the juvenile protégé, in response to a determination that the total number of e-mail messages transmitted exceeds a predetermined number, sending a warning message to an authority figure;

in response to a determination that the total number of e-mail messages is less than another predetermined number, sending the warning message to the authority figure, wherein the warning message describes a sender of the e-mail, the intended recipient of the e-mail, an e-mail address of the sender, and an e-mail address of the intended recipient; and displaying, on the video display device, a color-coded status of a specific e-mail message between the adult mentor and the juvenile protégé in a single displayed cell that is assigned for the specific e-mail message, wherein the single displayed cell identifies a sender of the specific e-mail message, wherein the single displayed cell has a color-coded background of orange, green or red, and wherein a color-coded background of: orange indicates that the specific e-mail message has been sent but not reviewed, green indicates that the specific e-mail message has been sent and reviewed, and red indicates that the specific e-mail message has been reviewed and blocked because of alarming content in the specific e-mail message, wherein the method further comprises the following initial steps executed prior to the process steps:

receiving, by an Assistance Allocation Manager (AAM), a Data for Initiating Assistance (DIA) from a hardware resource in a data processing system; and in response to said receiving the DIA, executing a rule in the AAM, wherein the DIA comprises computer performance data including Central Processor Unit (CPU) usage, clock speed, hardware temperature, and a total number of actual or allocated users of the hardware resource, wherein the rule in the AAM is specific to the performance data in the DIA and the hardware resource that sent the DIA, and wherein said executing the rule in the AAM causes the process steps to be executed for the hardware resource that sent the DIA.

5. The computer-readable hardware storage device of claim 4, wherein the computer executable instructions are further configured for:

in response to the displayed status indicating that the e-mail contains alarming information, blocking transmission of the e-mail to the intended recipient; and transmitting a warning message to an authority figure, wherein the warning message describes the alarming information in the e-mail, a sender of the e-mail, the intended recipient of the e-mail, a date and time-stamp for the e-mail, an e-mail address of the sender, and an e-mail address of the intended recipient.

6. The computer-readable hardware storage device of claim 5, wherein alarming information in the e-mail is automatically determined by specific keywords in the e-mail.

7. The computer-readable hardware storage device of claim 4, wherein the computer executable instructions are deployable to a client computer from a download server that is at a remote location.

8. The computer-readable hardware storage device of claim 4, wherein the computer executable instructions are provided by a download service provider to a client computer on an on-demand basis.

9. A method for monitoring e-mail messages to ensure proper mentoring, the method comprising the process steps of:

presenting to a reviewer a computer-based activity tracking form that is populated with data from an underlying relational database, wherein the underlying relational database includes a content of e-mail messages between a sender and a receiver, and wherein the underlying relational database includes a status of e-mail messages between the sender and the receiver as determined by an e-mail interceptor;

displaying, on a video display device, a status of an e-mail that has been intercepted by the e-mail interceptor;

in response to the displayed status indicating that the e-mail has not been reviewed by the reviewer, blocking transmission of the e-mail to the receiver;

in response to the displayed status indicating that the e-mail has been reviewed by the reviewer, enabling transmission of the e-mail to the receiver;

tracking a total number of e-mail messages transmitted between the sender and the receiver;

in response to a determination that the total number of e-mail messages transmitted exceeds a predetermined number, sending a warning message to an authority figure;

in response to a determination that the total number of e-mail messages is less than another predetermined number, sending the warning message to the authority figure, wherein the warning message describes a transmitter of the e-mail, an intended recipient of the e-mail, an e-mail address of the transmitter, and an e-mail address of the intended recipient; and displaying, on the video display device, a color-coded status of a specific e-mail message between the sender and the receiver in a single displayed cell that is assigned for the specific e-mail message, wherein the single displayed cell identifies a sender of the specific e-mail message, wherein the single displayed cell has a color-coded background of orange, green or red, and wherein a color-coded background of: orange indicates that the specific e-mail message has been sent but not reviewed, green indicates that the specific e-mail message has been sent and reviewed, and red indicates that the specific e-mail message has been reviewed and blocked because of alarming content in the specific e-mail message,
wherein the method further comprises the following initial steps executed prior to the process steps:
 receiving, by an Assistance Allocation Manager (AAM), a Data for Initiating Assistance (DIA) from a hardware resource in a data processing system; and
 in response to said receiving the DIA, executing a rule in the AAM, wherein the DIA comprises computer performance data including Central Processor Unit (CPU) usage, clock speed, hardware temperature, and a total number of actual or allocated users of the hardware resource, wherein the rule in the AAM is specific to the performance data in the DIA and the hardware resource that sent the DIA, and wherein said executing the rule in the AAM causes the process steps to be executed for the hardware resource that sent the DIA.

10. The method of claim 9, further comprising:
 in response to the displayed status indicating that the e-mail contains alarming information, blocking transmission of the e-mail to the receiver; and
 transmitting a warning message to an authority figure, wherein the warning message describes the alarming information in the e-mail, the transmitter of the e-mail, the intended recipient of the e-mail, a date and time-stamp for the e-mail, an e-mail address of the transmitter, and an e-mail address of the intended recipient.

11. The method of claim 10, wherein alarming information in the e-mail is automatically determined by specific keywords in the e-mail.

* * * * *